United States Patent

[11] 3,620,258

| [72] | Inventor | Robert Graham |
| | | Great Lumley, England |
| [21] | Appl. No. | 28,828 |
| [22] | Filed | Apr. 15, 1970 |
| [45] | Patented | Nov. 16, 1971 |
| [73] | Assignee | Newalls Insulation & Chemical Company Limited |
| | | Manchester, England |
| [32] | Priority | Apr. 16, 1969 |
| [33] | | Great Britain |
| [31] | | 19433/69 |

[54] INSULATION
2 Claims, 7 Drawing Figs.

[52] U.S. Cl. .................................................. 138/178, 138/140, 138/149
[51] Int. Cl. .................................................. F16l 9/22
[50] Field of Search ...................................... 138/140, 178, 137, DIG. 2, DIG. 4

[56] References Cited

UNITED STATES PATENTS

| 3,012,923 | 12/1961 | Slayter | 138/DIG. 2 |
| 3,295,558 | 1/1967 | Lenenety | 132/140 |

FOREIGN PATENTS

| 740,496 | 11/1955 | Great Britain | 132/140 |
| 1,134,237 | 11/1956 | France | 138/140 |

Primary Examiner—Herbert F. Ross
Attorney—Sughrue, Rothwell, Mion, Zinn & Macpeak

ABSTRACT: Curved pipes are thermally insulated by wedge-shaped annular elements of resin-bonded glass or other mineral fiber in which the fibers are perpendicular to the axes of the elements, so that these are axially compressible. The elements are pressed together into face-to-face contact along the pipe. They may be made by stamping cylinders out of fiberboards and cutting each cylinder along a plane inclined to the axis.

INSULATION

A common way of thermally insulating a pipe is to put preformed pipe sections of inorganic fibrous insulating material around it. In recent years such preformed sections essentially based on glass fiber or mineral wool have come into considerable use.

The usual way of making these pipe sections, particularly from glass fiber, comprises first producing a fiber mat by forming fibers and allowing them to fall onto a moving conveyor while simultaneously spraying them with a bonding agent. The bonding agent commonly used is a phenol-formaldehyde resin in the uncured state. In the mat the fibers are essentially present in layers, the fibers in each layer lying in the plane of it. The mat so produced is converted into pipe sections of low density by wrapping it spirally around a mandrel and curing the resin while the now cylindrical mat is on the mandrel. When the resin has been cured the pipe section, which may for example be 3 feet long, is slit parallel to the axis by a radial cut and at a diametrically opposite position another cut is made partially through the wall from the inner end. The pipe section can then be opened out to fit around a straight length of pipe, springing back into cylindrical form when it is around the pipe.

Such pipe sections of appropriate length are very effective on straight lengths of pipe, but bends in pipes give raise to difficulty.

The usual way of getting over this difficulty and the way in which it is done according to the invention will be best understood by reference to the accompanying drawings, in which.

Figure 1:
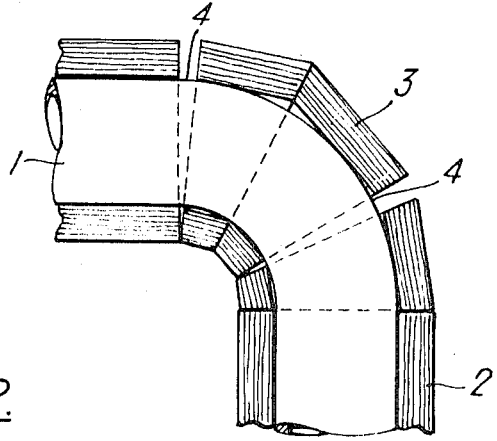
FIG. 1 shows a curved length of pipe insulated in the conventional fashion.

FIG. 1 shows the pipe at 1, two straight pipe sections 2 on straight lengths of the pipe and wedge-shaped elements 3 between the two pipe sections 2. These wedge-shaped elements 3 are made on the spot by the lagger, who makes an inclined cut through a pipe section. Now the cutting of these elements 3 requires a high degree of skill and takes time, and it quite often happens that the cuts are not made at exactly the desired angle or are not straight. FIG. 1 shows the effect when the elements are not quite right, and it will be seen that there are two gaps 4, with the result that the insulation is far from perfect. Moreover, if, as is often desirable, the fibrous insulation is encased by a protected covering of some plastic such as polyvinyl chloride, heat from the pipe passing through the gaps 4 may damage the covering.

It is normally impossible to close the gaps 4 by exerting pressure more or less parallel to the curved axis of the pipe because of the manner in which the elements have been made as described above. In effect each of the elements 3 consists of concentric laminations, and is effectively rigid axially.

The object in this invention is to provide considerable improvement in the insulation of curved lengths of pipe.

In the invention wedge-shaped elements are used but the fibers in the elements essentially lie in planes perpendicular to the cylindrical axis of the annulus, so that the elements are resiliently compressible in the axial direction, and when assembled around the pipe the elements are pressed together into complete face-to-face contact, which can easily be done because of the compressibility in the axial direction. Although it is much preferred to make the insulating elements of resin-bonded glass fiber, other inorganic fibers such, for example, as mineral wool may be used.

The wedge-shaped elements used in the invention are advantageously made mechanically in a factory, instead of manually as in the usual practice hitherto, two wedge-shaped elements being produced by a cut made through a right-cylindrical element. The angle at which this cut is made may be any desired so as to produce a greater or smaller degree of taper as seen in cross section. Moreover the cut may be so made as to produce two identical wedge-shaped elements, or one larger than the other. It is thus possible to supply elements of different shapes and sizes but each with a central hole or bore of diameter appropriate to the diameter of the pipe to be insulated, so that curved lengths of different curvature can easily be covered. Moreover, adjacent wedge-shaped elements may be assembled in different annular positions around a length of pipe.

Figure 2:
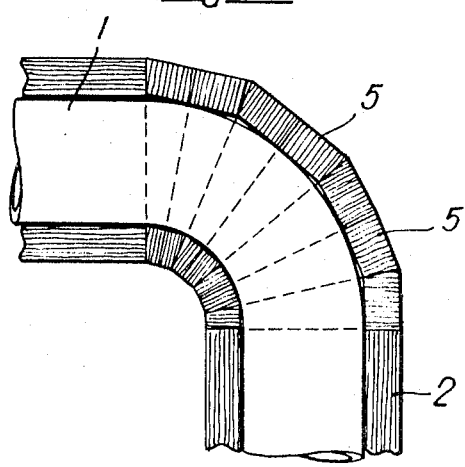
FIGS. 2 and 3 are views similar to FIG. 1 of curved lengths of pipe insulated according to the invention.
Figure 3:
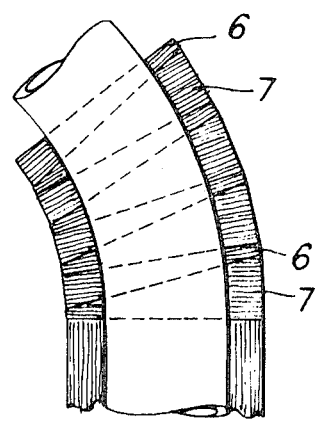

Two possibilities are shown by way of example in FIGS. 2 and 3. In FIG. 2, which closely resembles FIG. 1, seven wedge-shaped elements 5 according to the invention are assembled around a bend of short radius in a pipe between two cylindrical elements 2. In FIG. 3, which shows part of a curved length of pipe of greater radius, elements 6 and 7 of different sizes and of different angles of taper are alternated around the pipe, the smaller elements 6 having thicker edges on the inside of the bend and the larger elements 7 having their thicker edges on the outside of the bend.

The wedge-shaped elements used according to the invention can be produced from boards themselves made by curing the resin in a flat mat made as described above, the fibers in the board being of course parallel to the main faces of the board. This manufacture of the wedge-shaped elements is illustrated purely diagrammatically by FIGS. 4 to 7 of the drawings.

Figure 4:
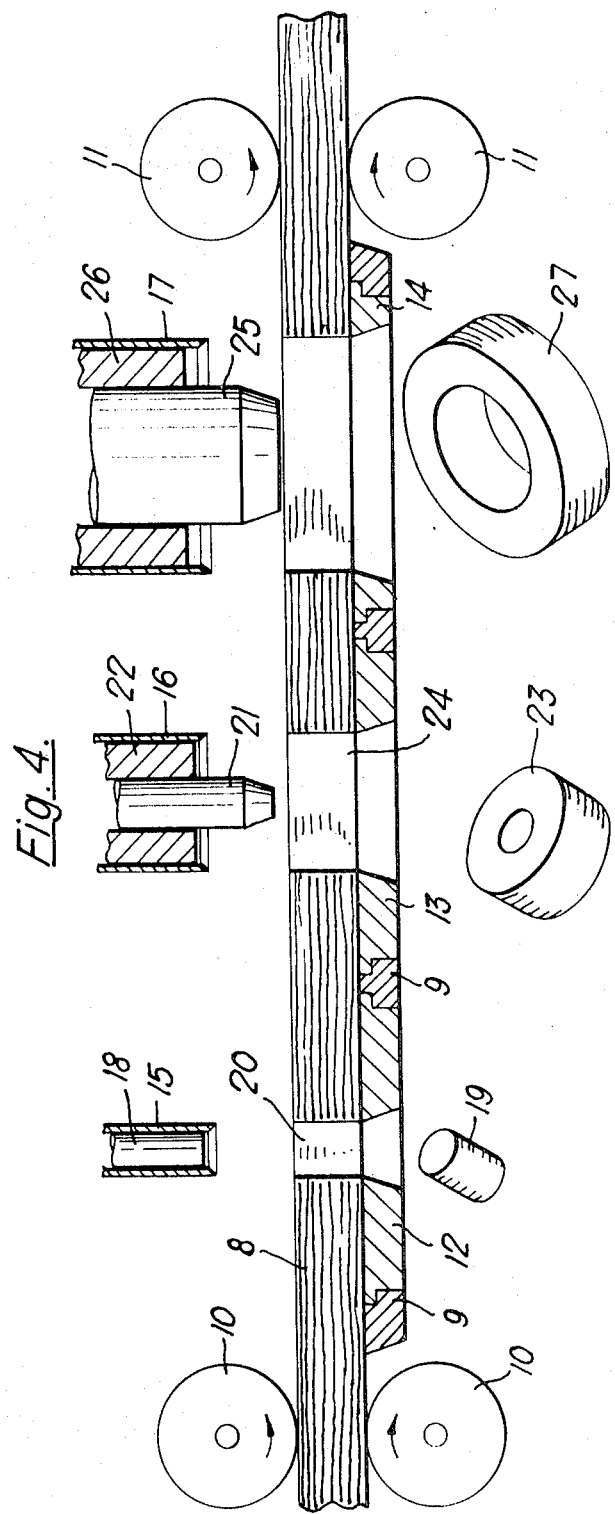
FIGS. 4 to 7 illustrate steps in the production of insulating elements used in the invention.

FIG. 4 shows a board of resin-bonded glass fiber 8 which is moved in stepwise fashion over a support comprising a series of horizontal bars 9 by rolls 10 and 11. Dies 12, 13 and 14 are mounted in the support beneath circular cutters 15, 16 and 17. The cutter 15 surrounds a ram 18, and when the board 8 is stationary descends to cut out a plug 19 which is driven out by the ram 18, thus leaving a cylindrical hole 20 in the board. The board is then moved onwards to bring the hole 20 into an alignment with a plunger 21 which lies within a ram 22 itself surrounded by the cutter 16. The ram 21 moves downwards into the hole 20 to bring about precise relative location of the board and the cutter 16, and the latter and the ram 22 move downwards to cut and drive outwards a right-cylindrical annular element 23 leaving a hole 24. The board then moves onwards again, to bring the hole 24 beneath a locating plunger 25 which works within a ram 26 that is surrounded by the cutter 17. At this station a further right-cylindrical annular element 27 is made.

Figure 5:
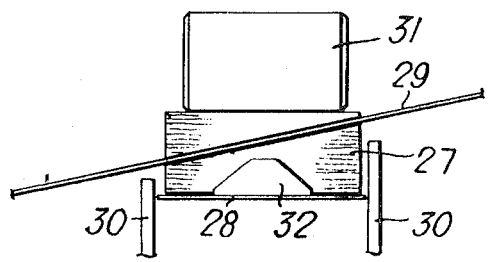

FIG. 5 shows one of the elements thus provided, say 27, carried by a conveyor 28 beneath a bandsaw 29. While being cut by the saw 29, the element 27 is restrained from lateral movement by side guides 30, is pressed downwards by a roller 31 and is positively driven forwards by a pusher 32 on the conveyor.

Figure 6:
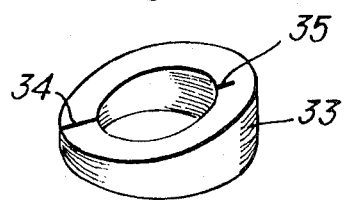

FIG. 6 is a perspective view of one of the two wedge-shaped elements 33 thus produced from the right-cylindrical element 27 after a radial cut 34 has been made completely through the wall, and a partial radial cut 35 has been made diametrically opposite to the cut 34, so that the element 32 can readily be assembled around the pipe.

It is desirable but not essential to seal the cut surfaces of the elements in order to consolidate them. Since the sealing largely serves to seal in the air it may additionally increase the insulating effect. A suitable material is water-based chlorinated rubber.

Figure 7:
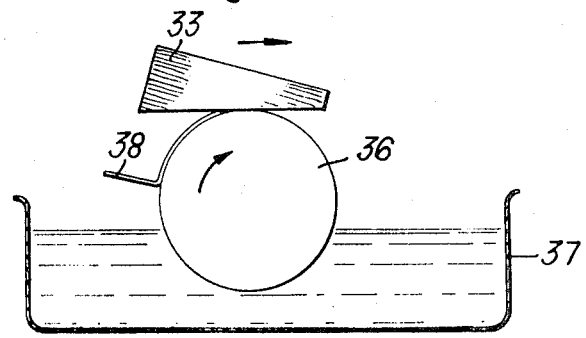

FIG. 7 shows an element 33 being moved by hand over a roll 36 which dips into a tank 37 of sealing material and carries this upwards beneath a scraper 38 to contact with the cut face of the element 33.

I claim:

1. A curved pipe surrounded by a plurality of axially split annular elements of inorganic, fibrous, thermally insulating material, some at least of which are wedge-shaped in side view, the fibers in said elements essentially lying in planes perpendicular to the cylindrical axis of the annulus, whereby said elements are resiliently compressible in the axial direction, and said elements being pressed together into complete face-to-face contact around the pipe.

2. A curved pipe according to claim 1 in which the elements are of resin-bonded glass fiber.

* * * * *